(12) United States Patent
Supakkul et al.

(10) Patent No.: US 8,135,786 B2
(45) Date of Patent: Mar. 13, 2012

(54) MESSAGE-BASED TECHNIQUE FOR SHARING DISTRIBUTION LIST CONTENTS WITHIN ELECTRONIC MESSAGING SYSTEMS

(75) Inventors: Tassanee K. Supakkul, Euless, TX (US); Mathews Thomas, Flower Mound, TX (US); Janki Y. Vora, Dallas, TX (US); Julio Wong, Pembroke Pines, FL (US)

(73) Assignee: International Business Machines Corporation, Armonk, NY (US)

( * ) Notice: Subject to any disclaimer, the term of this patent is extended or adjusted under 35 U.S.C. 154(b) by 380 days.

(21) Appl. No.: 12/363,380

(22) Filed: Jan. 30, 2009

(65) Prior Publication Data

US 2010/0198919 A1 Aug. 5, 2010

(51) Int. Cl.
*G06F 15/16* (2006.01)
(52) U.S. Cl. ...................................................... 709/206
(58) Field of Classification Search .......... 709/204–207, 709/213–216, 217–219
See application file for complete search history.

(56) References Cited

U.S. PATENT DOCUMENTS

| | | | |
|---|---|---|---|
| 6,035,337 A | 3/2000 | Redpath et al. | |
| 7,296,023 B2 | 11/2007 | Geyer et al. | |
| 7,376,835 B2 | 5/2008 | Olkin et al. | |
| 7,634,463 B1* | 12/2009 | Katragadda et al. | 1/1 |
| 2005/0080852 A1* | 4/2005 | Kelley et al. | 709/206 |
| 2007/0050456 A1* | 3/2007 | Vuong et al. | 709/206 |
| 2007/0233794 A1* | 10/2007 | Singh | 709/206 |
| 2008/0034042 A1* | 2/2008 | Costea et al. | 709/206 |
| 2008/0086527 A1 | 4/2008 | Sposetti et al. | |
| 2008/0168148 A1* | 7/2008 | Cama | 709/206 |
| 2008/0177626 A1* | 7/2008 | Nguyen | 705/14 |

OTHER PUBLICATIONS

Sandy Lawrence, Jun. 23, 2003, "Sharing a Distribution List".*
Outlook Shared Distribution List, Generic Parent, Feb. 7, 2007.*
Haake, J.M., et al., "End-User Controlled Group Formation and Access Rights Management in a Shared Workspace System," Proc. of 2004 ACM Conf. on Computer Supported Cooperative Work, Information Sharing and Access Session, pp. 554-563, 2004.
Sun, Y., et al., "Hierarchical Group Access Control for Secure Multicast Communications," IEEE/ACM Transactions on Networking, vol. 15, No. 6, pp. 1514-1526, Dec. 2007.
Sturm, C., et al., "An Access Control Mechanism for P2P Collaborations," ACN Proc. of 2008 Int'l Workshop on Data Management in Peer-to-Peer Systems, vol. 261, pp. 51-58, 2008.

* cited by examiner

*Primary Examiner* — Chirag Patel
(74) *Attorney, Agent, or Firm* — Patents on Demand P.A.; Brian K. Buchheit; Scott M. Garrett

(57) ABSTRACT

Prior to transmission, distribution list data associated with a user-defined distribution list can be embedded within an electronic message. The recipients of the electronic message should be members of an electronic communications system. The distribution list data can include a copy of the user-defined distribution list or a reference to a storage location containing the user-defined distribution list where access control policies can be applied. The electronic message can be conveyed to the recipients. In response to the user-selection of a user-defined distribution list during presentation of the electronic message, the recipient can be presented with distribution list options within a user interface. The distribution list options can represent actions to be performed upon the contents of the user-selected user-defined distribution list. Prior to execution of a user-selected distribution list option, the contents of the user-selected user-defined distribution list can be accessed using the embedded distribution list data.

20 Claims, 5 Drawing Sheets

MESSAGE-BASED TECHNIQUE FOR SHARING DISTRIBUTION LIST CONTENTS WITHIN ELECTRONIC MESSAGING SYSTEMS

BACKGROUND

The present invention relates to the field of electronic messaging and, more particularly, to sharing distribution list contents in electronic messaging systems.

Electronic messages, such as instant messages and emails, have become standard forms of communication in the modern business world, allowing geographically diverse parties to discuss and collaborate on business projects. A wide variety of tools and features exist that increase the usability of electronic messages, particularly distribution lists. Most electronic messaging applications allow a user to categorize other members into groups, typically called distribution lists, as a timesaving feature. For example, instead of having to enter each recipient email address manually when addressing an email message, instead, a user can address the email message with the name of a distribution list that contains the specified email addresses. The distribution list is then available for reuse on subsequent email messages.

While advantageous for the creator/sender, the use of distribution lists tends to pose access and/or visibility issues for the recipients. In most conventional electronic messaging systems, the creator and/or designated members of the distribution list are capable of accessing the contents of the distribution list. Members receiving the electronic message are typically only able to see the name of the distribution group. In some cases, this obscuring of distribution list members is intentional and protects a sender's contact information from being disseminated to others. When a recipient wants to reply to an electronic message, however, he/she can be unaware of the identities of the other members to whom they are sending their reply. Further, the recipients should each be members of an electronic communication system.

Some electronic messaging systems have attempted to overcome this issue by replacing the name of the distribution list with the addresses of its members. Although this approach provides recipients with visibility to the other members, they must still perform any actions with the distribution list manually. For example, when a recipient wants to have a copy of an email distribution list available for use when sending email messages, the recipient must take the time to create the distribution list manually within their email address book.

Additionally, the use of distribution lists in conventional electronic messaging systems is confined to a single electronic message type. That is, an email distribution list is only usable for sending emails, an instant messaging group for sending instant messages, and so on. This situation requires that users reiterate their distribution lists between electronic messaging systems of different types, which can be a time consuming manual endeavor prone to errors.

BRIEF SUMMARY

One aspect of the present invention can include a method and computer program product for sharing distribution list contents. This aspect can begin with embedding distribution list data associated with a user-defined distribution list within a text-based electronic message prior to transmission of the message. The recipients of the text-based electronic message can include the user-defined distribution list. Further, the recipients can be members of an electronic communications system. The distribution list data can include a copy of contents of the user-defined distribution list and/or a reference to a storage location containing the contents of the user-defined distribution list. Then, the text-based electronic message can be conveyed to the recipients. In response to a user-selection of the user-defined distribution list during presentation of the text-based electronic message within a user interface of an electronic messaging application, a recipient can be presented with distribution list options for the user-selected user-defined distribution list within the user interface. The distribution list options can represent actions to be performed upon the contents of the user-selected user-defined distribution list. Prior to execution of a user-selected distribution list option, the contents of the user-selected user-defined distribution list can be accessed utilizing the embedded distribution list data.

Another aspect of the present invention can include a system for sharing distribution list contents. Such a system can include an electronic communications system and a distribution list share handler. The electronic communications system can be configured to convey a text-based electronic message to recipients. The recipients can include user-defined distribution lists. The distribution list share handler can be configured to provide the recipients with access to contents of the user-defined distribution lists by utilizing distribution list data. The distribution list data can be embedded within the text-based electronic message. The distribution list data can include a copy of contents of a user-defined distribution list and/or a reference to a storage location containing the contents of the user-defined distribution list.

DETAILED DESCRIPTION

Figure 1:
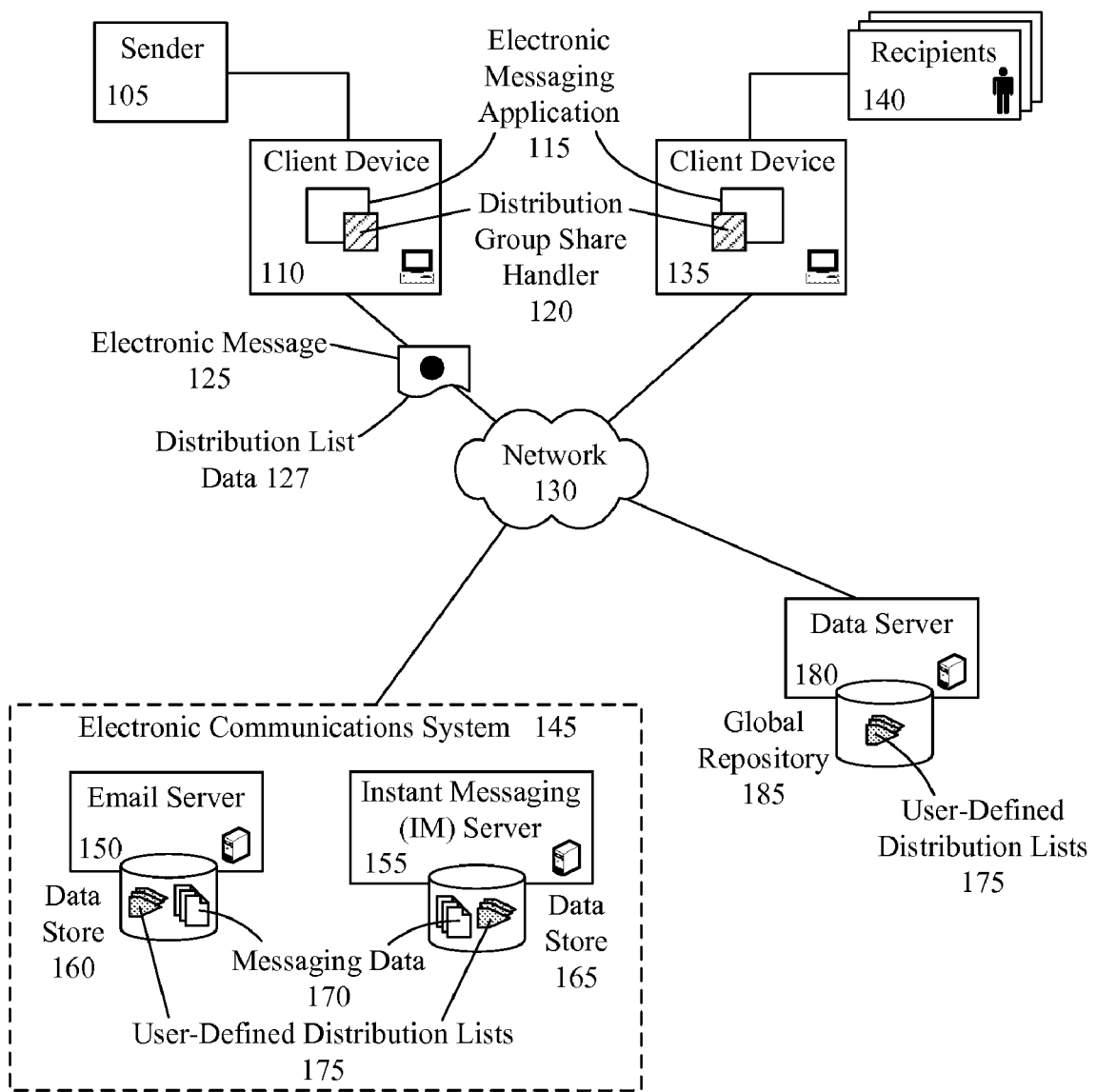
FIG. 1 is a schematic diagram illustrating a system that utilizes a message-based approach to share user-defined distribution lists in accordance with embodiments of the inventive arrangements disclosed herein.

The present invention discloses a solution for sharing distribution list contents utilizing distribution list data embedded within an electronic message. An electronic message having a distribution list addressee can be modified by a distribution list share handler, prior to transmission, to contain distribution list data associated with the distribution list addressee. The distribution list data can be a copy of the distribution list contents and/or a reference to a storage location containing the distribution list contents. A recipient viewing the text-based electronic message can be presented with one or more distribution list options upon selection of the user-defined distribution list. The distribution list share handler can utilize the embedded distribution list data to provide the recipient access to the contents of the selected user-defined distribution list. In one embodiment, access control features can be implemented to limit access to distribution list data by user-specific and configurable permission levels.

The present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer usable storage medium having computer usable program code embodied in the medium. In a preferred embodiment, the invention is implemented in software, which includes but is not limited to firmware, resident software, microcode, etc.

Furthermore, the invention can take the form of a computer program product accessible from a computer usable or computer readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus, or device. The computer usable medium may include a propagated data signal with the computer usable program code embodied therewith, either in baseband or as part of a carrier wave. The computer usable program code may be transmitted using any appropriate medium, including but not limited to the Internet, wireline, optical fiber cable, RF, etc.

Any suitable computer usable or computer readable medium may be utilized. The computer usable or computer readable medium may be, for example but not limited to, an electronic, magnetic, optical, electromagnetic, infrared, or semiconductor system, apparatus, device, or propagation medium. Examples of a computer readable medium include a semiconductor or solid state memory, magnetic tape, a removable computer diskette, a random access memory (RAM), a read-only memory (ROM), an erasable programmable read-only memory (EPROM or Flash memory, a rigid magnetic disk and an optical disk. Current examples of optical disks include compact disk-read only memory (CD-ROM), compact disk-read/write (CD-R/W) and DVD. Other computer readable medium can include a transmission media, such as those supporting the Internet, an intranet, a personal area network (PAN), or a magnetic storage device. Transmission media can include an electrical connection having one or more wires, an optical fiber, an optical storage device, and a defined segment of the electromagnet spectrum through which digitally encoded content is wirelessly conveyed using a carrier wave.

Note that the computer usable or computer readable medium can even include paper or another suitable medium upon which the program is printed, as the program can be electronically captured, for instance, via optical scanning of the paper or other medium, then compiled, interpreted, or otherwise processed in a suitable manner, if necessary, and then stored in a computer memory.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

FIG. 1 is a schematic diagram illustrating a system 100 that utilizes a message-based approach to share user-defined distribution lists 175 in accordance with embodiments of the inventive arrangements disclosed herein. In system 100, a user-defined distribution list 175 can be shared by a sender 105 of an electronic message 125 with the message recipients 140.

The sender 105 can create the text-based and/or text inclusive electronic message 125 using an electronic messaging application 115 operating on a client device 110. A text portion of the message 125 can be included in a body of the message 125, and/or in meta data associated with the message 125. The electronic messaging application 115 can represent a software application that can provide the sender 105 and/or recipient 140 with an interaction mechanism with an electronic communications system 145.

The electronic communications system 145 can represent the hardware and/or software necessary for supporting communication of electronic messages 125 between the client devices 110 and 135 over a network 130. The electronic communications system 145 can include an email server 150 and an instant messaging (IM) server 155, each with an associated data store 160 and 165, respectively. Other types of communication servers (not shown) can be included in system 145, such as voice over internet protocol (VoIP) servers, fax servers, text messaging servers, co-browsing servers, social networking servers, and the like. One or more of the optional other servers of system 145 can utilize user defined distribution lists 175 able to be shared with other servers (e.g., server 150 and/or server 155).

In one embodiment, the servers 150, 155 shown in the electronic communication system 145 can be located remotely from each other and can be distinct and separate communication systems, each having their own user-defined distribution list 175. Each of these distribution lists 175 can include system specific data (e.g., email, IM, etc.) different than the contact data maintained by another server 150, 155 of system 145. In one embodiment, the electronic communications system 145 can contain a single electronic messaging server possessing functionality described for server 150 and 155. Further, in one embodiment, a separate and distinct data server 180 can remotely perform functions to share distribution lists data among server 150 and server 155. This functionality for example, can be implemented as a server (e.g., a Web service). In another embodiment, one or more of the servers 150, 155 can internally include the functionality to share a user defined list 175 without reliance on an external server 180.

It should be noted that the use of multiple types of electronic messaging servers 150 and 155 within the electronic communications system 145, as shown in system 100, can require the use of multiple electronic messaging applications 115 by the client devices 110 and 135. That is, the client device 110/135 can have access to electronic messaging applications 115 that correspond with the electronic messaging servers 150 and 155 of the electronic communications system 145. In one embodiment, one or more of the electronic message applications 115 can interface with a multitude of different types of servers of system 145 to create a unified front-end user experience. In one embodiment, one or more of the messaging applications 115 can be a Web application executing within a browser of a device 110, 135.

As shown, the email server 150 can allow the sender 105 to send email messages 125, while the IM server 155 can allow the transmission of instant messages 125. The data stores 160 and 165 of the messaging servers 150 and 155, respectively, can contain messaging data 170 and user-defined distribution lists 175. The messaging data 170 can correspond to stored electronic messages 125 and/or related information.

The user-defined distribution lists 175 can correspond to groupings of electronic communications system 145 members, allowing an efficient address mechanism for the electronic messages 125. The user-defined distribution lists 175 can include an access type that can be used to restrict access to the contents of the user-defined distribution list 175 by recipients 140. For example, a user-defined distribution list 175 having an access type of "Members Only" can only be accessed by recipients 140 who are members of the user-defined distribution list 175.

The electronic message 125 created by the sender 105 can be addressed to one or more user-defined distribution lists 175. When the electronic message 125 contains a user-defined distribution list 175 as an addressee, the distribution list share handler 120 can be utilized to allow the contents of the user-defined distribution list 175 to be shared with the recipients 140.

The distribution list share handler 120 can be a software application configured to provide the recipients 140 with access to the user-defined distribution lists 175 contained as addressees of an electronic message 125. The distribution list share handler 120 can operate from the client device 110 and 135 and can interface with the electronic messaging application 115 and the electronic communications system 145.

In another embodiment, the distribution list share handler 120 can operate from the electronic communications system 145. In such an embodiment, the distribution list share handler 120 can reside on the email server 150, IM server 155, or another network server (not shown).

The distribution list share handler 120 can embed distribution list data 127 to the electronic message 125 sent by the sender 105. The distribution list data 127 can represent the mechanism that allows the contents of the user-defined distribution list 175 to be accessed by the recipient 140. The access type of the user-defined distribution list 175 can also be included within the distribution list data 127.

Examples of distribution list data 127 can include, but are not limited to, the contents of the user-defined distribution list 175 and a reference to a storage location, such as global repository 185, containing the contents of the user-defined distribution list 175. The lists 175 in the global repository 185 can include indexing information to relate a user identifier specific to one server 150, 155 of system 145 to a corresponding user identifier specific to a different server 150, 155. For example, an email user name can be related to a corresponding IM user name. Because multiple different user names can exist for different specific instances of a communication type (i.e., two or more different email accounts for a person, two or more different IM accounts, etc.) a person unique identifier can be stored in the global repository 185, which relates to each of the other use identifiers used in any server 150, 155 of system 145.

When the distribution list data 127 contains a reference, the distribution list share handler 120 can store a copy of the contents of the user-defined distribution list 175 within a global repository 185 residing on a data server 180, as illustrated in system 100. The global repository 185 can represent a data store accessible by the distribution list share handler 120 of the sender 105 and recipients 140. In another embodiment, the global repository 185 can reside within the electronic communications system 145.

A recipient 140 can execute command options within the electronic messaging application 115 of their client device 135 that can access the contents of a user-defined distribution list 175 contained within a received electronic message 125. The distribution list share handler 120 operating from the recipient's 140 client device 135 can utilize the distribution list data 127 of the received electronic message 125 to access the contents of the user-defined distribution list 175 selected by the recipient 140.

For example, when the distribution list data 127 contains the contents of the user-defined distribution list 175, the distribution list share handler 120 can extract the embedded content to allow the electronic messaging application 115 to perform the selected option, such as viewing the members of the user-defined distribution list 175.

The client devices 110 and 135 utilized by the sender 105 and recipients 140 can represent any of a variety of computing devices capable of running the electronic messaging application 115 and communicating with the electronic communications system 145 and data server 180 over the network 130. Examples of the client devices 110 and 135 can include, but, are not limited to, a personal computer, a laptop computer, a mobile phone, a smart phone, a personal data assistant (PDA), and the like.

Additionally, use of the distribution list share handler 120 and distribution list data 127 can allow for a user-defined distribution list 175 to be shared between messaging servers 150 and 155 of different types contained within the electronic communications system 145. That is, a user-defined email distribution list 175 can be used as an address for an instant message 125, and vice versa.

Network 130 can include any hardware/software/and firmware necessary to convey data encoded within carrier waves. Data can be contained within analog or digital signals and conveyed though data or voice channels. Network 130 can include local components and data pathways necessary for communications to be exchanged among computing device components and between integrated device components and peripheral devices. Network 130 can also include network equipment, such as routers, data lines, hubs, and intermediary servers which together form a data network, such as the Internet. Network 130 can also include circuit-based communication components and mobile communication components, such as telephony switches, modems, cellular communication towers, and the like. Network 130 can include line based and/or wireless communication pathways.

As used herein, presented data stores 160 and 165 and global repository 185 can be a physical or virtual storage space configured to store digital information. Data stores 160 and 165 and global repository 185 can be physically implemented within any type of hardware including, but not limited to, a magnetic disk, an optical disk, a semiconductor memory, a digitally encoded plastic memory, a holographic memory, or any other recording medium. Data stores 160 and 165 and global repository 185 can be a stand-alone storage unit as well as a storage unit formed from a plurality of physical devices. Additionally, information can be stored within data stores 160 and 165 and global repository 185 in a variety of manners. For example, information can be stored within a database structure or can be stored within one or more files of a file storage system, where each file may or may not be indexed for information searching purposes. Further, data stores 160 and/or 165 and/or global repository 185 can utilize one or more encryption mechanisms to protect stored information from unauthorized access.

Figure 2:
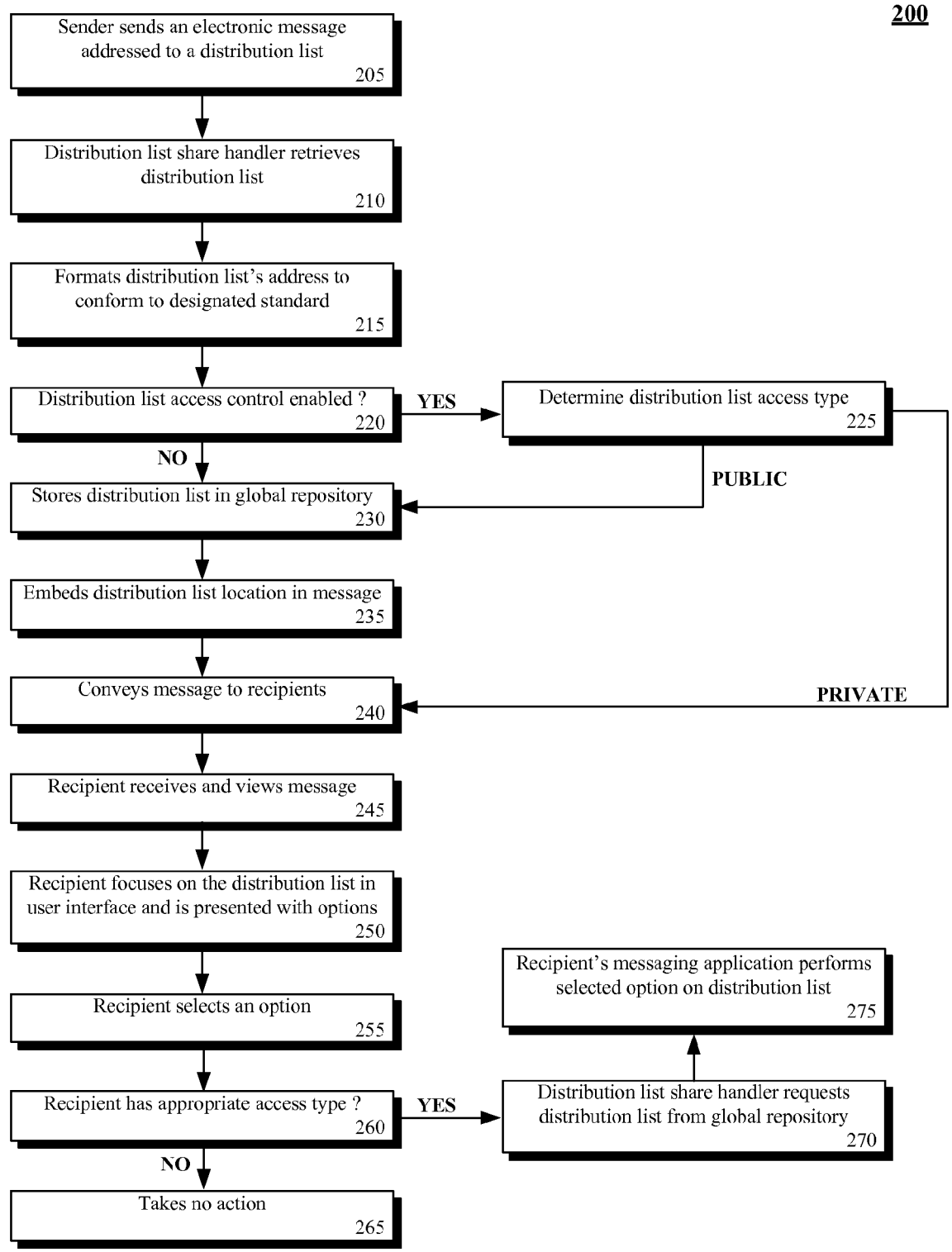
FIG. 2 is a flow chart of a method detailing an example process for using message-embedded distribution list data to share user-defined distribution list contents in accordance with an embodiment of the inventive arrangements disclosed herein.

FIG. 2 is a flow chart of a method 200 detailing an example process for using message-embedded distribution list data to share user-defined distribution list contents in accordance with an embodiment of the inventive arrangements disclosed herein. Method 200 can be performed in the context of system 100 or any other system configured to utilize message-embedded distribution list data to share the contents of a user-defined distribution list, herein referred to as the distribution list.

Method 200 can begin with step 205 where a sender can send an electronic message addressed to a distribution list. In step 210, the distribution list share handler can retrieve the contents of the distribution list. If necessary, the address of the distribution list can be formatted to a designated standard in step 215.

In step 220, it can be determined if access controls are enable for the sharing of the distribution list contents. When access controls are enabled, step 225 can execute where the access type of the distribution list can be determined.

When the access type of the distribution list is "PUBLIC", step 230 can execute where the contents of the distribution list can be stored in a global repository. Execution of step 230 can also occur when it is determined that access controls are not enabled in step 220.

After execution of step 230, the distribution list share handler can embed the distribution list data in the electronic message in step 235. Since this example utilizes storage of the distribution list contents in a global repository, the distribution list data can include a reference to the distribution list contents within the global repository.

In step 240, the electronic message can be conveyed to the recipients. Execution of step 240 can also occur when it is determined that the distribution list has an access type of "PRIVATE" in step 225. It should be noted that the use of "PUBLIC" and "PRIVATE" access types within method 200 are for illustrative purposes only and are not meant as limitation of an embodiment of the present invention.

A recipient can receive and view the electronic message within a user interface in step 245. In step 250, the recipient can select the distribution list within the user interface and can be presented with distribution list options.

It should be noted that selection of the distribution list within the user interface can be interpreted by a variety of user actions, such as, but not limited to, the hovering of a pointing device over the distribution list name, a right-click command over the distribution list name, a highlighting of the distribution list name, the performance of such user actions in combination with one or more keyboard strokes, and the like.

The recipient can select a distribution list option in step 255. In step 260, it can be determined if the recipient matches the access type of the distribution list. When the recipient does not match the access type of the distribution list, step 265 can execute where no action is taken by the system.

When the recipient matches the access type of the distribution list, the distribution list share handler can retrieve the distribution list contents in step 270. In the example described by method 200, step 270 can retrieve the distribution list contents from the global repository. In step 275, the recipient's messaging application can perform the selected option on the distribution list contents.

Figure 3:
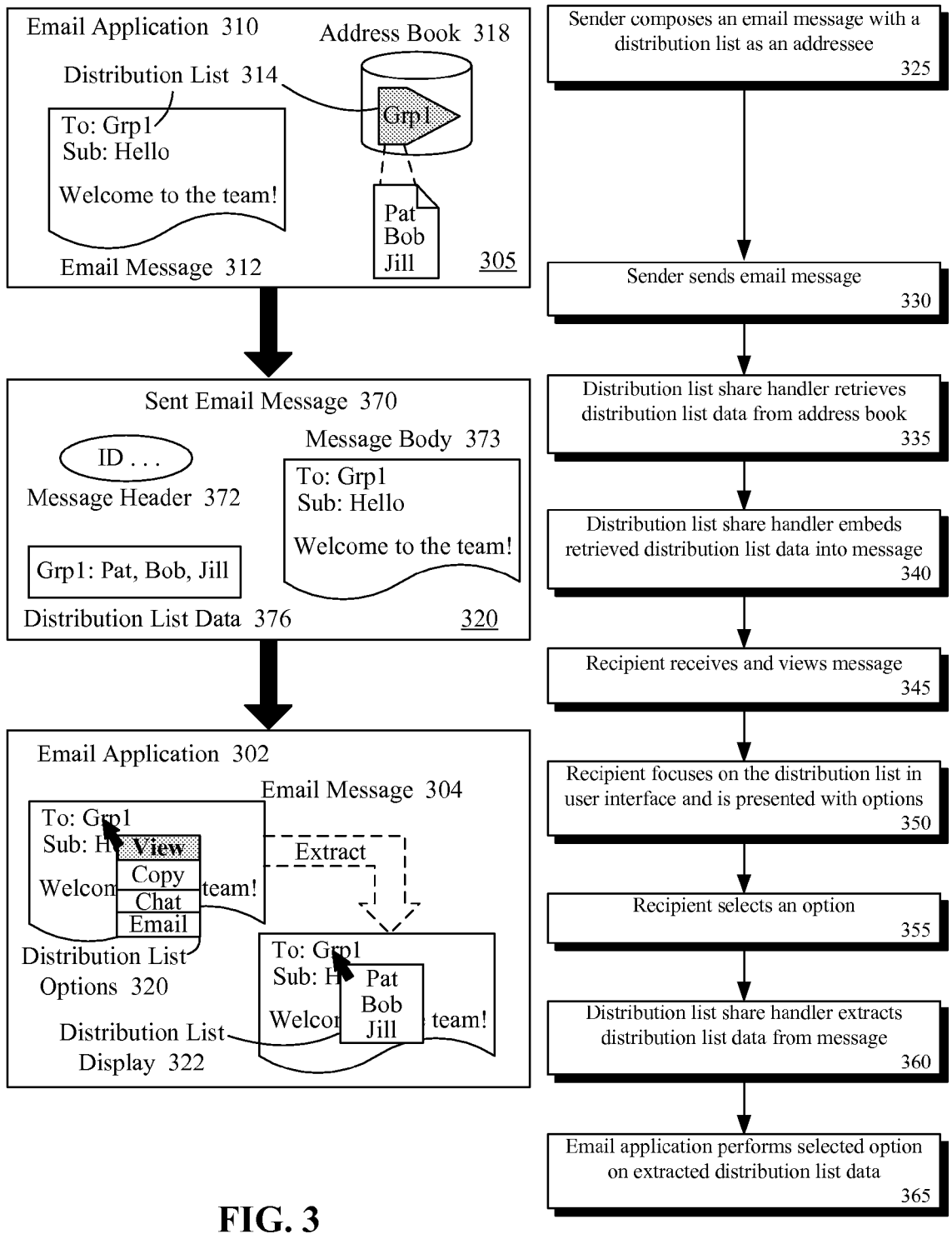
FIG. 3 is an illustrated method describing an example utilizing an email messaging system in accordance with an embodiment of the inventive arrangements disclosed herein.

FIG. 3 is an illustrated method 300 describing an example utilizing an email messaging system in accordance with an embodiment of the inventive arrangements disclosed herein. Illustrated method 300 can be utilized by system 100 and can represent a related embodiment of method 200.

Illustrated method 300 can begin with step 325 where a sender can compose an email message with a distribution list as an addressee. As shown in illustration 305, an email message 312 created within an email application 310 can be addressed to a distribution list 314. The contents of the distribution list 314 can be stored in the sender's address book 318.

In step 330, the sender can send the email message. The distribution list handler can retrieve the distribution list contents from the address book in step 335. Access control policies, if implemented, can be acquired and handled at this time. In step 340, the distribution list share handler can embed the retrieved contents as distribution list data into the email message.

Illustration 320 can depict the embedded email message 370 created by the distribution list share handler. The embedded email message 370 can contain the message header information 372 and message body 373 (as generated by the email application 310 in illustration 305) and the distribution list data 376 embedded by the distribution list share handler.

In step 345, the recipient can receive and view the email message. As shown in illustration 380, the recipient can select the distribution list within the user interface of the email application 382 and can then be presented with distribution list options 385, as indicated by step 350. In step 355, the recipient can select a presented distribution list option 385.

The distribution list share handler can extract the distribution list data from the email message 384 in step 360. In step 365, the email application 380 can perform the selected distribution list option 385 on the extracted distribution list contents.

In illustration 380, "VIEW" is the selected distribution list option 385. As such, the recipient can be presented with the distribution list display 386.

Figure 4:
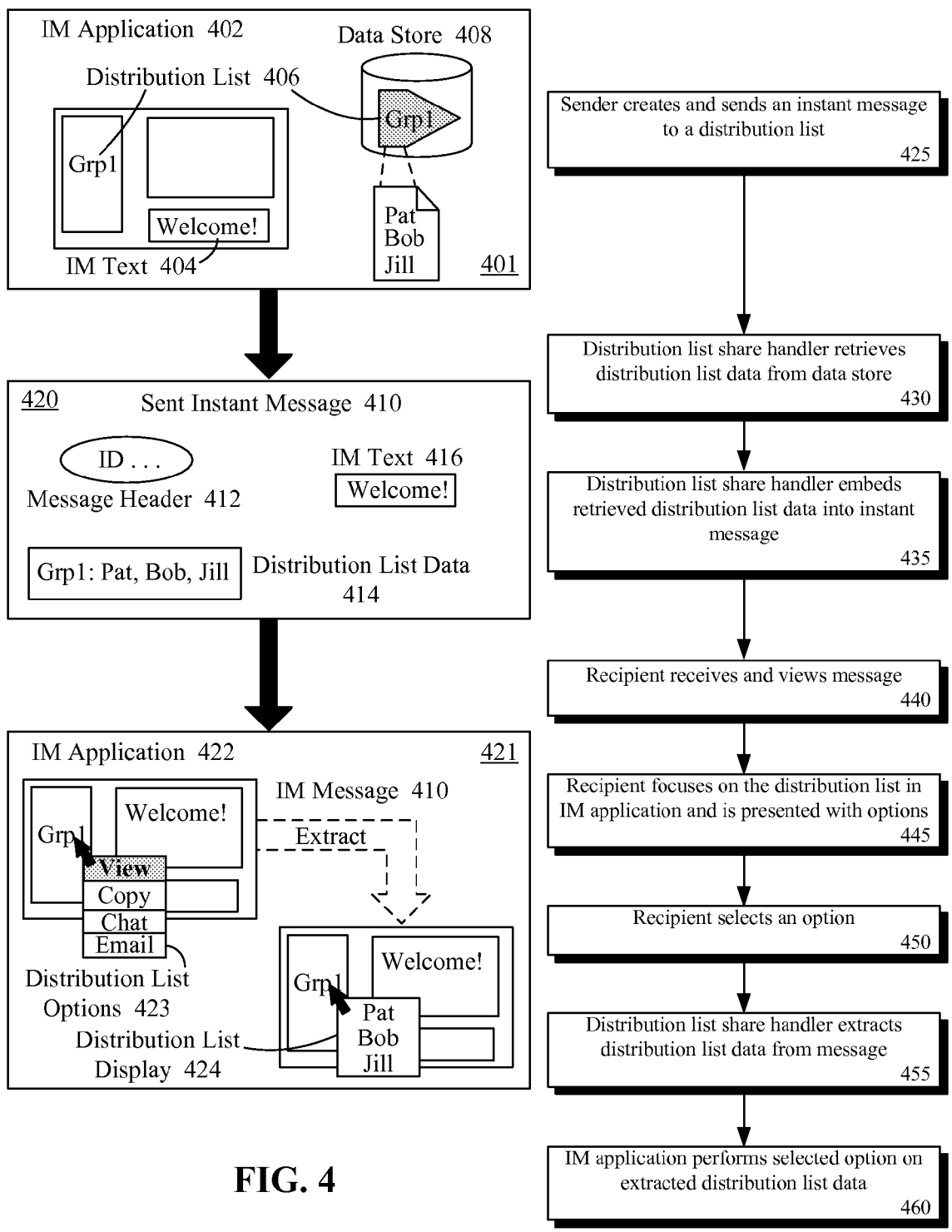
FIG. 4 is an illustrated method describing an example utilizing an instant messaging system in accordance with an embodiment of the inventive arrangements disclosed herein.

FIG. 4 is an illustrated method 400 describing an example utilizing an instant messaging system in accordance with an embodiment of the inventive arrangements disclosed herein. Illustrated method 400 can be utilized by system 100 and can represent a related embodiment of method 200.

Illustrated method 400 can begin with step 425 where a sender can create and send an instant message (IM) to a distribution list. As shown in illustration 401, IM text 404 entered into the IM application 402 can be addressed to a distribution list 406. The contents of the distribution list 406 can be stored in a data store 408 associated with the IM application 402.

In step 430, the distribution list handler can retrieve the distribution list contents from the data store. Access control policies can be optionally retrieved at this point, in which case handling will proceed in accordance with the retrieved access control policies. In step 435, the distribution list share handler can embed the retrieved contents as distribution list data into the instant message.

Illustration 420 can depict the embedded instant message created by the distribution list share handler. The embedded instant message 410 can contain the message header information 412 and IM text 416. Distribution list data 414 can be embedded by the distribution list share handler into message 410.

In step 440, the recipient can receive and view the instant message. The recipient can select the distribution list within the user interface of the IM application 402 and can then be presented with distribution list options 423 in step 445, as shown in illustration 421. In step 450, the recipient can select a presented distribution list option 423.

The distribution list share handler can extract the distribution list data from the instant message in step 455. In step 460, the IM application 422 can perform the selected distribution list option 423 on the extracted distribution list contents.

In illustration 421, "VIEW" is the selected distribution list option 423. As such, the recipient can be presented with the distribution list display 424.

Figure 5:
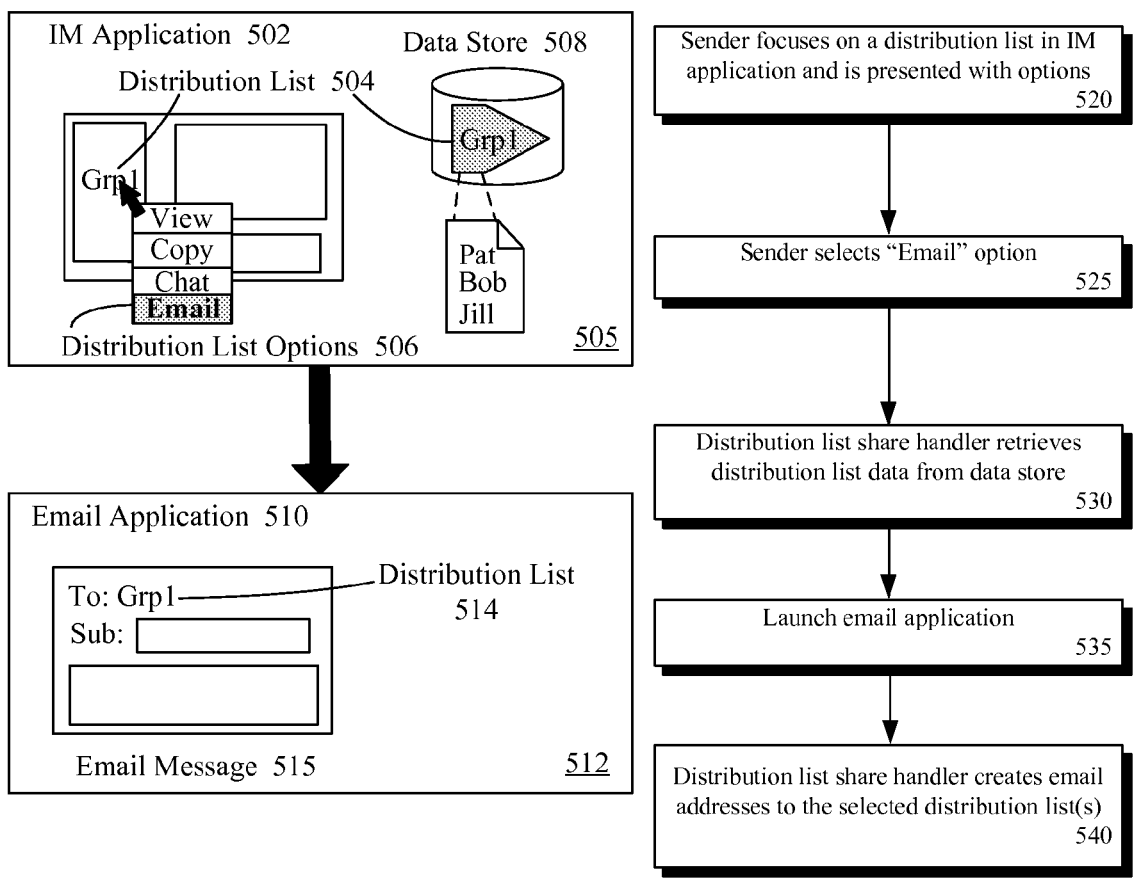
FIG. 5 is an illustrated method describing an example utilizing the distribution share handler to share distribution lists between electronic messaging systems in accordance with an embodiment of the inventive arrangements disclosed herein.

FIG. 5 is an illustrated method 500 describing an example utilizing the distribution share handler to share distribution lists between electronic messaging systems in accordance with an embodiment of the inventive arrangements disclosed herein. Illustrated method 500 can be utilized by system 100 and can represent a related embodiment of method 200.

Illustrated method 500 can begin with step 520 where a sender can select a distribution list in an IM application and can be presented with distribution list options. As shown in illustration 505, distribution list options 506 can be presented upon selection of distribution list 504 within the IM application 502. The contents of the distribution list 504 can be stored in a data store 508 associated with the IM application 502.

In step 525, the sender can select the "EMAIL" option. The distribution list share handler can retrieve the distribution list contents from the data store in step 530. If an access control policy is implemented and enabled, an appropriate policy can be retrieved at this stage. In step 530, the distribution list share handler can utilize the retrieved content as input for the execution of an email process. The email process can represent a set of instructions that can perform system and/or application-specific commands on behalf of a calling application.

In step 535, the sender's email application 510 can launch, as shown in illustration 512. The email application 510 can permit the sender to create a new email message 515 having at least one distribution list 514, which includes those individuals (excepting lack of permission based upon implemented access controls) include in the selected distribution list 504. That is, in step 540, the distribution list share handler can create email addresses (for distribution list 514) as needed for the selected distribution lists (e.g., list 504).

The diagrams in FIGS. 1-5 illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for sharing distribution list contents comprising:
    prior to transmission, embedding distribution list data associated with at least one user-defined distribution list within an electronic message, wherein recipients of the electronic message comprise at least one user-defined distribution list, wherein said recipients are members of an electronic communications system, and, wherein the distribution list data comprises a reference to a destination storage location of the contents of the at least one user-defined distribution list, wherein the contents of the at least one user-defined distribution list comprise user identifiers of members of the at least one distribution list, wherein the embedding of the distribution list data comprises:
        i) retrieving contents of the at least one user-defined distribution list from a source storage location;
        ii) copying the retrieved contents of the at least one user-defined distribution list to the destination storage location, wherein the destination storage location is accessible by the recipients; and
        iii) generating the reference for the copied contents of the at least one user-defined distribution;
    conveying the electronic message to the recipients;
    in response to a user-selection of a user-defined distribution list during presentation of the electronic message within a user interface of an electronic messaging application, presenting the recipient with at least one distribution list option for the user-selected user-defined distribution list within the user interface, wherein the at least one distribution list option represents an action performed upon the contents of the user-selected user-defined distribution list; and
    prior to execution of a user-selected distribution list option, accessing the contents of the user-selected user-defined distribution list utilizing the reference to the destination storage location of the conveyed electronic message.

2. The method of claim 1, wherein the at least one distribution list option comprises at least one of a copy distribution list option, a view distribution list option, an initiate response message option, and a store distribution list option.

3. The method of claim 2, wherein the initiate response message option enables the recipient to respond to the electronic message using an alternate electronic messaging application, wherein the user-defined distribution list is available for use within the alternate electronic messaging application, and, wherein the alternate electronic messaging application is supported within the electronic communications system.

4. The method of claim 1, wherein the electronic message comprises at least one of an email message and an instant message.

5. The method of claim 1, wherein the destination storage location is a different storage location than the source storage location.

6. The method of claim 1, wherein the accessing of the contents of the user-selected user-defined distribution list further comprises:
    obtaining the storage location reference for the user-selected user-defined distribution list from the embedded distribution list data; and
    retrieving the contents of the user-selected user-defined distribution list from the destination storage location utilizing the reference.

7. The method of claim 1, wherein the electronic communications system comprises an instant messaging system.

8. The method of claim 1, wherein the embedding of the distribution list data and the accessing of the contents of the user-selected user-defined distribution list are performed by a distribution list share handler.

9. The method of claim 8, wherein the distribution list share handler is a client-side component of the electronic messaging application.

10. The method of claim 8, wherein the distribution list share handler is a server-side component of the electronic messaging application.

11. The method of claim 1, wherein the electronic communications system comprises an email messaging system.

12. The method of claim 1, wherein the accessing of the contents of the user-selected user-defined distribution list is governed by an access type, wherein the access type defines members of the user-defined distribution list capable of executing the at least one distribution list option upon the user-selected user-defined distribution list.

13. A system for sharing distribution list contents comprising:
    an electronic communications system, comprising at least one processor, a memory and computer program instructions stored in the memory that are executable by the at least one processor, configured to convey an electronic message to at least one recipient, wherein the at least one recipient comprises at least one user-defined distribution list; and
    a distribution list share handler, comprising at least one processor, a memory and computer program instructions stored in the memory that are executable by the at least one processor, configured to provide the at least one recipient of the electronic message with access to contents of the at least one user-defined distribution list utilizing distribution list data, wherein the distribution list data is embedded within the electronic message by:
        i) retrieving contents of the at least one user-defined distribution list from a source storage location;
        ii) copying the retrieved contents of the at least one user-defined distribution list to a destination storage location, wherein the destination storage location is accessible by the recipients; and
        iii) generating a reference for the copied contents of the at least one user-defined distribution,
    wherein the distribution list data comprises the reference to the destination storage location of the contents of the at least one user-defined distribution list, wherein the contents of the at least one user-defined distribution list comprise user identifiers of members of the at least one distribution list
    wherein in response to a user-selection of a user-defined distribution list during presentation of the electronic message within a user interface of an electronic messaging application, presenting the recipient with at least one distribution list option for the user-selected user-defined distribution list within the user interface, wherein the at least one distribution list option represents an action performed upon the contents of the user-selected user-defined distribution list; and prior to execution of a user-selected distribution list option, accessing the contents of the user-selected user-defined distribution list utilizing the reference to the destination storage location of the conveyed electronic message.

14. The system of claim 13, wherein the distribution list share handler is a client-side component of the electronic communications system.

15. The system of claim 13, wherein the distribution list share handler is a server-side component of the electronic communications system.

16. The system of claim 13, wherein the electronic communications system comprises at least one of an email messaging system and an instant messaging system.

17. The system of claim 13, when the distribution list data comprises the destination storage location reference, further comprising:
   a global repository configured to store the contents of the user-defined distribution list data, wherein said global repository is accessible by the electronic communications system, the distribution list share handler, and the at least one recipient.

18. The system of claim 13, wherein access to the contents of the at least one user-defined distribution list is governed by an access type contained within the distribution list data.

19. A computer program product for sharing distribution list contents comprising a non-transitory computer readable storage medium having computer usable program code embodied therewith, the computer usable program code comprising:
   computer usable program code configured to, prior to transmission, embed distribution list data associated with at least one user-defined distribution list within an electronic message, wherein recipients of the electronic message comprise at least the at least one user-defined distribution list, wherein said recipients are members of an electronic communications system, and, wherein the distribution list data comprises at a reference to a destination storage location of the contents of the at least one user-defined distribution list, wherein the computer usable program code configured to embed the distribution list data is further configured to:
      retrieve the contents of the at least one user-defined distribution list from a source storage location;
      copy the retrieved contents of the at least one user-defined distribution list to the destination storage location, wherein the destination storage location is accessible by the recipients; and
      generate the reference for the copied contents of the at least one user-defined distribution list;
   computer usable program code configured to conveying the electronic message to the recipients;
   computer usable program code configured to, in response to a user-selection of a user-defined distribution list during presentation of the electronic message within a user interface of an electronic messaging application, present the recipient with at least one distribution list option for the user-selected user-defined distribution list within the user interface, wherein the at least one distribution list option represents an action performed upon the contents of the user-selected user-defined distribution list; and
   computer usable program code configured to, prior to execution of a user-selected distribution list option, access the contents of the user-selected user-defined distribution list utilizing the reference to the destination storage location of the conveyed electronic message.

20. The computer program product of claim 19, wherein the contents of the at least one user-defined distribution list comprise user identifiers of members of the at least one distribution list.

* * * * *